(12) United States Patent
Lourdu Raja et al.

(10) Patent No.: US 12,273,866 B2
(45) Date of Patent: Apr. 8, 2025

(54) NARROW-BAND INTERNET OF THINGS PHYSICAL RANDOM-ACCESS CHANNEL (NPRACH) RECEIVER

(71) Applicant: Mavenir Systems, Inc., Richardson, TX (US)

(72) Inventors: Charles Santhosam Lourdu Raja, Bangalore (IN); Karthik Muralidhar, Bangalore (IN)

(73) Assignee: Mavenir Systems, Inc., Richardson, TX (US)

( * ) Notice: Subject to any disclaimer, the term of this patent is extended or adjusted under 35 U.S.C. 154(b) by 394 days.

(21) Appl. No.: 17/697,150

(22) Filed: Mar. 17, 2022

(65) Prior Publication Data

US 2022/0312418 A1 Sep. 29, 2022

(30) Foreign Application Priority Data

Mar. 23, 2021 (IN) .............................. 202121012447

(51) Int. Cl.
*H04W 72/0453* (2023.01)
*H04L 5/00* (2006.01)
(Continued)

(52) U.S. Cl.
CPC ....... *H04W 72/0453* (2013.01); *H04L 5/0007* (2013.01); *H04L 27/01* (2013.01); *H04L 27/2602* (2013.01); *H04W 74/0833* (2013.01)

(58) Field of Classification Search
CPC .......... H04W 72/0453; H04W 74/0833; H04L 5/0007; H04L 27/01; H04L 27/2602
See application file for complete search history.

(56) References Cited

U.S. PATENT DOCUMENTS 7,463,678 B2    12/2008  Ginesi et al.
9,660,855 B2 *   5/2017  Williams .............. H04L 27/265
(Continued)

OTHER PUBLICATIONS

Cheng et al "Demo Abstract-Design and Implementation of an Open Source NB-IoT eNB", 2018 IEEE Conference on Computer Communications Poster and Demo, Apr. 15, 2018, IEEE.
(Continued)

*Primary Examiner* — Benjamin H Elliott, IV
*Assistant Examiner* — Tracy Lauren Colbert
(74) *Attorney, Agent, or Firm* — Ruggiero McAllister & McMahon LLC

(57) ABSTRACT

A method of Narrow-band Internet of Things physical random-access channel (NPRACH) communication includes: transmitting, from a user equipment (UE), a Narrow-band Internet of Things (NB-IoT) Orthogonal Frequency-Division Multiple Access (OFDMA) symbol using a transmit inverse fast Fourier transform (Tx-IFFT) having a first length; processing, at lower physical layer (LPHY) of a baseband unit (BBU), the NB-IoT OFDMA symbol using a receive fast Fourier transform (Rx-FFT) having a second length different from the first length to generate an Rx-FFT output; sending, from the LPHY of the BBU to upper physical layer (UPHY) of the BBU, a selected number of values of the Rx-FFT output corresponding to desired resources block in the NB-IoT OFDMA symbol; filtering, at the UPHY, intercarrier interference (ICI) from the selected number of values of the Rx-FFT output; and reconstructing, at the UPHY, the NB-IoT OFDMA symbol.

12 Claims, 13 Drawing Sheets

(51) Int. Cl.
   *H04L 27/01*       (2006.01)
   *H04L 27/26*       (2006.01)
   *H04W 74/0833*     (2024.01)

(56) References Cited

U.S. PATENT DOCUMENTS

2019/0288901 A1* 9/2019 Pekoz ................ H04L 27/2605
2019/0289497 A1* 9/2019 Rajagopal ............ H04B 7/0456
2022/0272513 A1* 8/2022 Park ........................ H04W 4/70

OTHER PUBLICATIONS

Extended European Search Report for corresponding European Application No. 22163494.2, 8 pages, dated Aug. 19, 2022.
Chakrapani "NB-IoT Uplink Receiver Design and Performance Study", 2018 IEEE Internet of Things Journal, vol. 7, No. Mar. 3, 2020, IEEE.
XRAN Forum "xRAN Fronthaul Working Group White Paper" Oct. 2017, xRAN Forum,.

* cited by examiner

NARROW-BAND INTERNET OF THINGS PHYSICAL RANDOM-ACCESS CHANNEL (NPRACH) RECEIVER

BACKGROUND OF THE DISCLOSURE

1. Field of the Disclosure

The present disclosure relates to systems and methods for Narrow-band Internet of Things (NB-IoT), and relates more particularly to systems and methods for NB-IoT physical random-access channel (NPRACH) communication.

2. Description of the Related Art

Internet of Things (IoT) envisions an environment in which everything that can benefit from a connection to the Internet will be connected to the Internet. Narrow-band Internet of Things (NB-IoT), which is a 3rd Generation Partnership Project (3GPP) standard to support low-power wide-area (LPWA) IoT applications, is designed to accommodate a massive number of low-rate, low-cost, and delay-tolerant IoT devices, which are also referred to as user equipments (UEs). Like Long Term Evolution (LTE) technology, NB-IoT uses Orthogonal Frequency-Division Multiple Access (OFDMA) for downlink and Single Carrier Frequency-Division Multiple Access (SC-FDMA) for uplink. Since the devices connected are low throughput devices, the system bandwidth of NB-IoT is 180 kHz for both downlink and uplink. Similar to LTE networks, each UE in NB-IoT is attached to an LTE base station, called an eNodeB (eNB), through a random-access procedure. The LTE systems use a random-access procedure involving the use of a random-access preamble based on Zadoff-Chu sequences. However, in order to support extended coverage and cater to massive number of UEs and long battery lifetime, Zadoff-Chu sequences are not used in NB-IoT systems. In order to cater to the needs of NB-IoT systems, a new uplink random-access waveform has been adopted by the 3GPP as an integral part of the NB-IoT standard, which new uplink random-access waveform is carried on the NB-IoT physical random-access channel (NPRACH). NPRACH waveform (or signal) is a single-tone frequency-hopping preamble (preamble is the first uplink signal sent by a UE to establish connection with the eNB).

In Open Radio Access Network (O-RAN), a significant portion of the RAN layer processing is performed at a baseband unit (BBU), located in the cloud on commercial off the shelf servers, while the radio frequency (RF) and real-time critical functions can be processed in the remote radio unit (RRU), also referred to as the radio unit (RU). The BBU can be split into two parts: centralized unit (CU) and distributed unit (DU). For the RRU and DU to communicate, an interface called the fronthaul is provided. There are multiple options defined by 3GPP for the split between the BBU and the RRU among different layers of the protocol stack, and one of the split options standardized by O-RAN Alliance is split option 7-2 (Intra-Physical (PHY) layer split). In the split option 7.2 architecture, the physical layer is split into two parts: i) lower PHY (or LPHY), and ii) upper PHY (or UPHY). The LPHY receives signals from RF modules, does substantially all time-domain processing and applies fast Fourier transform (FFT), then passes frequency domain values to UPHY. For example, in the case of LTE, LPHY passes 12 values per resource block (RB) to UPHY, and in the case of NB-IoT PRACH, the LPHY is expected to pass 64 values to UPHY (64-point FFT of which UPHY uses the relevant per-RB 48 values). In the present description, we use the acronym LTE-LPHY to refer to an LPHY that is designed to process LTE signals only. The LPHY that supports NB-IoT (also referred to as NB-IoT-LPHY) should have additional processing to give the values to UPHY.

In the context of NB-IoT PRACH, the following problem is posed: how to have NB-IoT feature in UPHY without a compatible NB-IoT-LPHY? Since NB-IoT-LPHY needs aliasing filter, low-pass filter (LPF) and decimator to extract NB-IoT PRACH and pass it to UPHY, how to reconstruct NB-IoT PRACH without an NB-IoT-LPHY (instead simply using a LPHY that is capable of processing only LTE signals) is a quandary.

Accordingly, there is a need for a solution for reconstructing NB-IoT PRACH using a LPHY that is capable of processing only LTE signals. More fundamentally, there is a need for a method involving an OFDM transmitter with a different IFFT length in comparison to an OFDM receiver's FFT length, which transmitter transmits on only a subset of possible subcarriers, and which receiver uses an appropriate equalizer to determine the values transmitted on the subset of subcarriers.

SUMMARY OF THE DISCLOSURE

According to an example embodiment according to the present disclosure, a method for transmitting and receiving in an OFDM system is provided, in which method the length of the transmit inverse fast Fourier transform (Tx-IFFT) at the transmitter (e.g., UE or base station (BS)) and the length of the receive fast Fourier transform (Rx-FFT) at the receiver (e.g., BS or UE) are different, which transmitter transmits on only a subset of possible subcarriers, and which receiver uses an appropriate equalizer to determine the values transmitted on the subset of subcarriers.

According to an example embodiment according to the present disclosure, reconstruction of NB-IoT PRACH without an NB-IoT-LPHY (instead simply using an LTE-LPHY that is capable of processing, e.g., only LTE signals) is enabled by providing an additional processing module (e.g., functioning as an equalizer) between the LTE-LPHY and NB-IoT PRACH receiver (also referred to as NB-IoT PRACH detector), which additional processing module enables NB-IoT PRACH detector in UPHY to work with an LTE-LPHY that supports, e.g., only LTE operations.

According to an example embodiment according to the present disclosure, the received NB-IoT OFDM symbol is processed by LTE-LPHY, which LTE-LPHY then sends selected (e.g., 12) values from the FFT output corresponding to the NB-IoT resource block (RB) to the UPHY (the selected values from the FFT output are referred to as desired LTE-LPHY output (DLLO) in the present disclosure). Because the LTE-LPHY processing results in the DLLOs sent to the UPHY to have intercarrier-interference (ICI), an example embodiment according to the present disclosure provides an equalizer that processes the DLLOs to remove the ICI.

According to an example embodiment according to the present disclosure, reconstruction of NB-IoT PRACH without an NB-IoT-LPHY (instead simply using an LPHY that is designed to process, e.g., 5G New Radio signals only, which LPHY is referred to by the acronym 5G-NR-LPHY) is enabled by providing an additional processing module (e.g., functioning as an equalizer) between the 5G-NR-LPHY and NB-IoT PRACH receiver (also referred to as NB-IoT PRACH detector), which additional processing module enables NB-IoT PRACH detector in UPHY to work with a 5G-NR-LPHY that supports, e.g., only 5G-NR operations.

According to an example embodiment according to the present disclosure, the received NB-IoT OFDM symbol is processed by 5G-NR-LPHY, which 5G-NR-LPHY then sends selected (e.g., 12) values from the FFT output corresponding to the NB-IoT resource block (RB) to the UPHY (the selected values from the FFT output are referred to as desired 5G-NR-LPHY output (DNLO) in the present disclosure). Because the 5G-NR-LPHY processing results in the DNLOs sent to the UPHY to have intercarrier-interference (ICI), an example embodiment according to the present disclosure provides an equalizer that processes the DNLOs to remove the ICI.

BRIEF DESCRIPTION OF THE FIGURES

FIG. 2a illustrates a symbol group for NPRACH.

FIG. 2b illustrates the parameter values for the symbol group shown in FIG. 2a.

DETAILED DESCRIPTION

Preamble, which is the first uplink signal sent by a UE to establish connection with the Evolved Node B (eNB), is designed to support large number of UEs with good reliability. The preamble is used to acquire uplink timing and perform timing advances. In order to serve different UEs with a range of pathloss, three coverage enhancement classes are defined, namely CE0, CE1, CE2. In each class configuration, a preamble repetition value is specified, with more repetitions for higher CE level (for serving farther UEs). Classical OFDM symbol structure consists of a cyclic prefix (CP) portion and a data symbol. In NB-IoT, an OFDM symbol is repeated five times and then a CP is added. A group of five OFDM symbols and a CP is collectively called a symbol group (SG). Before beginning the random-access (connection) procedure, a UE synchronizes itself with the symbol timing and carrier frequency of eNB by using the narrowband primary synchronization signal (NPSS), and the UE can determine to which of the three coverage enhancement classes the UE belongs by measuring the power of the received reference NPSS signal. Then, from the system information block (SIB) embedded in the Narrowband Physical Downlink Shared Channel (NPDSCH) signal from the eNB, the UE determines the starting time and length for the transmission of its preamble sequences.

NB-IoT system parameters include the following: bandwidth (W)=180 kHz; subcarrier spacing=3.75 kHz; and number of subcarriers=180/3.75=48. Each UE transmits on one of the 48 subcarriers in the first symbol group. Depending on the index of the subcarrier out of the 48 subcarriers, a preamble hopping pattern is defined and the UE transmits according to the defined preamble hopping pattern. There are four symbol groups in one repetition. Each repetition hops pseudo-randomly based on cell ID. Number of repetitions can be 1, 2, 4, 8, 16, 32, 64, or 128. Within a repetition, hopping patterns of four symbol groups is deterministic. Since there are 48 subcarriers, up to 48 UEs can simultaneously send their NPRACH preambles within the NB-IoT bandwidth of 180 kHz. However, the frequency hopping can be over a region of 12, 24, 36 or 48 subcarriers. The kth UE ($UE_k$) is identified by its $n_{init}(k)$ parameter in the range [0-47], which is used to generate the preamble hopping pattern for consecutive single-tone SGs. Among the 48 available preamble sequences, the UE selects one sequence and transmits it. It is important to note that all the NPRACH hopping patterns are distinct.

Figure 1:
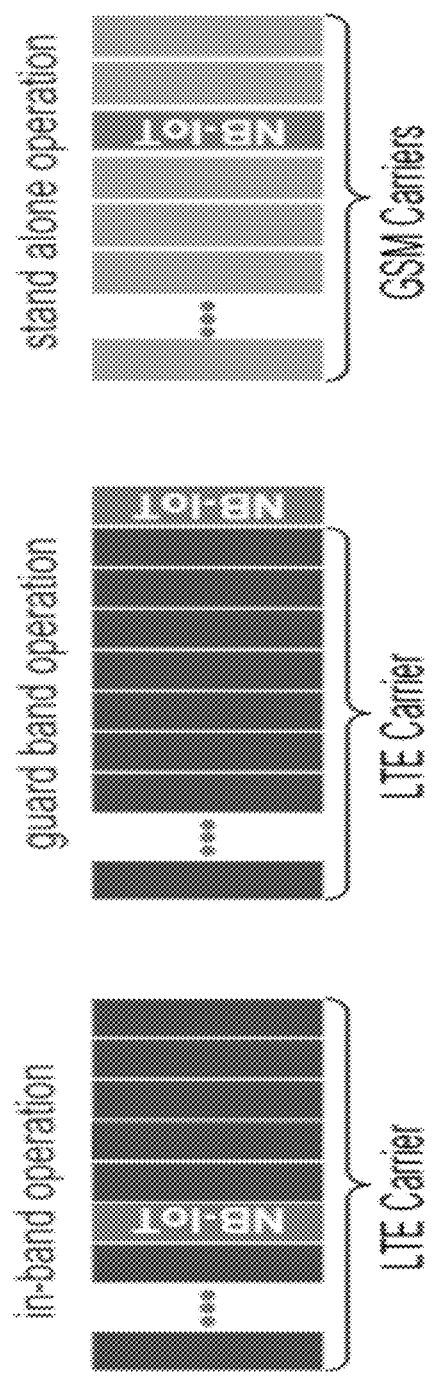
FIG. 1 illustrates different modes of operation for NB-IoT.

There are three modes of operation for NB-IoT, as shown in FIG. 1: i) in-band operation, in which the NB-IoT utilizes one of the RBs of the LTE signal; ii) stand-alone operation, in which the NB-IoT utilizes currently-used Global System for Mobile Communications (GSM) frequencies (because each GSM channel has 200 kHz bandwidth, utilization for NB-IoT (180 kHz bandwidth) still leaves a guard interval of 10 kHz remaining on both sides of the spectrum; and iii) guard-band operation, in which the NB-IoT utilizes the unused resource blocks within an LTE carrier's guard-band.

Figures 2A, 2B:
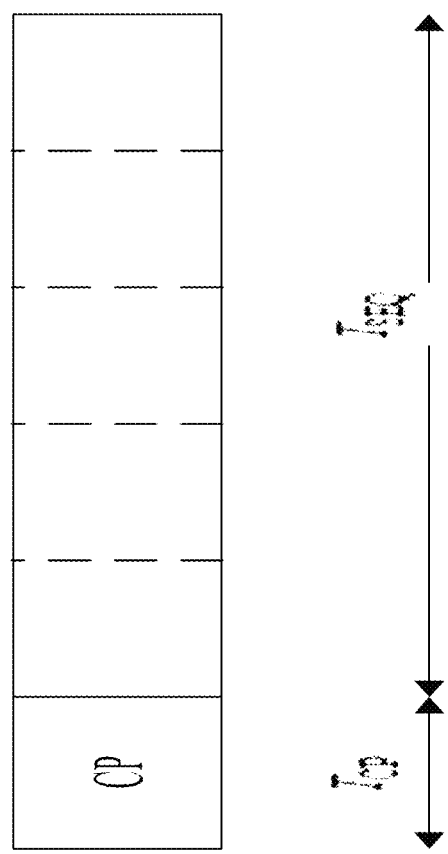

NPRACH transmit waveform will be discussed in this section. As mentioned above, in NB-IoT, an OFDM symbol is repeated five times and a CP is added. The parameters of NPRACH transmit waveform and generation of NPRACH transmit signal are described in 3GPP TS 36.211, version 13.2.0, Release 13. The parameters of NPRACH waveform and generation of NPRACH transmit signal are presented below to the extent necessary for the understanding of the example embodiments. The physical layer random access preamble is based on single-subcarrier frequency-hopping symbol groups. A symbol group is illustrated in FIG. 2a, consisting of a cyclic prefix of length $T_{CP}$ and a sequence of 5 identical symbols with total length $T_{SEQ}$. The parameter values are listed in the table shown in FIG. 2b.

Figure 3:
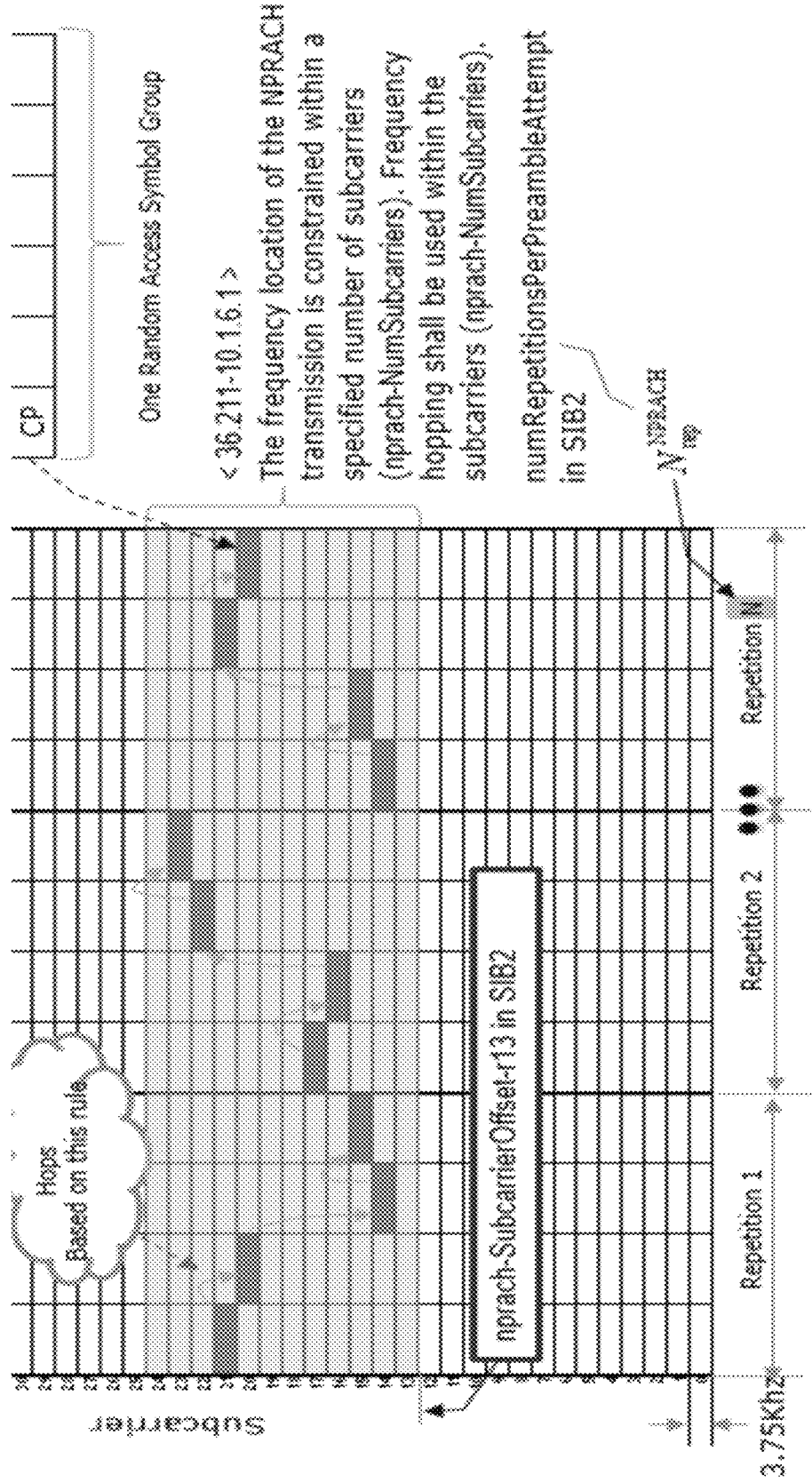
FIG. 3 illustrates an example of NB-IoT hopping.

The preamble consisting of 4 symbol groups transmitted without gaps shall be transmitted rep $N_{rep}^{NPRACH}$ times. Known hopping happens between symbol groups of a repetition, while cell-ID-based hopping happens between repetitions. FIG. 3 illustrates an example of NB-IoT hopping.

The PRACH region can be over a region of 12, 24, 36 or 48 subcarriers. The transmission of a random-access preamble, if triggered by the Media Access Control (MAC) layer, is restricted to certain time and frequency resources. An NPRACH configuration provided by higher layers contains the following:

i) NPRACH resource periodicity, $N_{period}^{NPRACH}$ (nprach-Periodicity), ii) frequency location of the first subcarrier allocated to NPRACH, $N_{scoffset}^{NPRACH}$ (nprach-SubcarrierOffset), iii) number of subcarriers allocated to NPRACH, $N_{sc}^{NPRACH}$ (nprach-NumSubcarriers), iv) number of starting sub-carriers allocated to UE-initiated random access, $N_{sc\_cont}^{NPRACH}$ (nprach-NumCBRA-StartSubcarriers), v) number of NPRACH repetitions per attempt, $N_{rep}^{NPRACH}$ rep (numRepetitionsPerPreambleAttempt), vi) NPRACH starting time, $N_{start}^{NPRACH}$ (nprach-StartTime), vii) fraction for calculating starting subcarrier index for the range of NPRACH subcarriers reserved for indication of UE support for multi-tone msg3 transmission, $N_{MSG3}^{NPRACH}$ (nprach-SubcarrierMSG3-RangeStart).

NPRACH transmission can start only $N_{start}^{NPRACH} \cdot 30720T_s$ time units after the start of a radio frame fulfilling $n_f \mod (N_{period}^{NPRACH}/10)=0$. After transmissions of $4 \cdot 64$ $(T_{CP}+T_{SEQ})$ time units, a gap of $40 \cdot 30720T_s$ time units shall be inserted. NPRACH configurations where $N_{scoffset}^{NPRACH}+N_{sc}^{NPRACH}>N_{sc}^{UL}$ are invalid. The NPRACH starting subcarriers allocated to UE-initiated random access are split in two sets of subcarriers, namely $\{0, 1, \ldots, \lfloor N_{sc\_cont}^{NPRACH} N_{MSG3}^{NPRACH} \rfloor -1\}$ and $\{\lfloor N_{sc\_cont}^{NPRACH} N_{MSG3}^{NPRACH} \rfloor, \ldots, N_{sc\_cont}^{NPRACH}-1\}$, where the second set, if present, indicates UE support for multi-tone msg3 transmission.

The frequency location of the NPRACH transmission is constrained within $N_{sc}^{RA}=12$ subcarriers. Frequency hopping shall be used within the 12 subcarriers, where the frequency location of the $i^{th}$ symbol group is given by $n_{sc}^{RA}=n_{start}+\tilde{n}_{sc}^{-RA}(i)$ where $n_{start}=N_{scoffset}^{NPRACH}+\lfloor n_{init}/N_{sc}^{RA}\rfloor \cdot N_{sc}^{RA}$ and $\tilde{n}_{sc}^{RA}(i) =$ $$\begin{cases} (\tilde{n}_{sc}^{RA}(0) + f(i/4)) \bmod N_{sc}^{RA} & i \bmod 4 = 0 \text{ and } i > 0 \\ \tilde{n}_{sc}^{RA}(i-1) + 1 & i \bmod 4 = 1, 3 \text{ and } \tilde{n}_{sc}^{RA}(i-1) \bmod 2 = 0 \\ \tilde{n}_{sc}^{RA}(i-1) - 1 & i \bmod 4 = 1, 3 \text{ and } \tilde{n}_{sc}^{RA}(i-1) \bmod 2 = 1 \\ \tilde{n}_{sc}^{RA}(i-1) + 6 & i \bmod 4 = 2 \text{ and } \tilde{n}_{sc}^{RA}(i-1) < 6 \\ \tilde{n}_{sc}^{RA}(i-1) - 6 & i \bmod 4 = 2 \text{ and } \tilde{n}_{sc}^{RA}(i-1) \geq 6 \end{cases}$$

$$f(t) = \left(f(t-1) + \left(\sum_{n=10t+1}^{10t+9} c(n)2^{n-(10t+1)}\right) \bmod (N_{sc}^{RA} - 1) + 1\right) \bmod N_{sc}^{RA}$$

$$f(-1) = 0$$

where $n_{SC}^{-RA}(0)=n_{init} \bmod N_{sc}^{RA}$ with $n_{init}$ being the subcarrier selected by the MAC layer from $\{0, 1, \ldots, N_{sc}^{NPRACH}-1\}$, and the pseudo random sequence $c(n)$ is given by clause 7.2 in 3GPP TS 36.211, version 13.2.0, Release 13. The pseudo random sequence generator shall be initialized with $c_{init}=N_{ID}^{Ncell}$.

Baseband signal generation will be discussed in this section. The time-continuous random access signal $s_i(t)$ for symbol group corresponding to symbol group i is defined by $s_i(t)=\beta_{NPRACH} e^{j2\pi(n_{sc}^{RA}(i)+Kk_0+1/2)\Delta f_{RA}(t-T_{CP})}$ In the case $0<t<T_{SEQ}+T_{CP}$, $\beta_{NPRACH}$ is an amplitude scaling factor in order to, conform to the transmit power $P_{NPRACH}$ specified in clause 16.3.1 in 3GPP TS 36.213, V14.2.0, Release 14, $k_0=-N_{sc}^{UL}/2$, $K=\Delta f/\Delta f_{RA}$ accounts for the difference in subcarrier spacing between the random access preamble and uplink data transmission, and the location in the frequency domain controlled by the parameter $n_{sc}^{RA}(i)$ is derived from clause 10.1.6.1 in 3GPP TS 36.211, version 13.2.0, Release 13. The variable $\Delta f_{RA}$ is given by table below:

| Preamble format | $\Delta f_{RA}$ |
|---|---|
| 0, 1 | 3.75 kHz |

In the O-RAN split option 7.2 architecture, the physical layer is split into two parts: i) lower PHY (or LPHY), and ii) upper PHY (or UPHY). The LPHY receives signals from RF modules, does substantially all time-domain processing and applies fast Fourier transform (FFT), then passes frequency domain values to UPHY. For example, in the case of LTE (and in the case of 5G-NR utilizing 15 kHz subcarrier spacing), LPHY passes 12 values per resource block (RB) to UPHY, and in the case of NB-IoT PRACH, the LPHY is expected to pass 64 values to UPHY (64-point FFT of which UPHY uses the relevant per-RB 48 values). In the present description, we use the acronym LTE-LPHY to refer to an LPHY that is designed to process LTE signals only.

Figure 4:
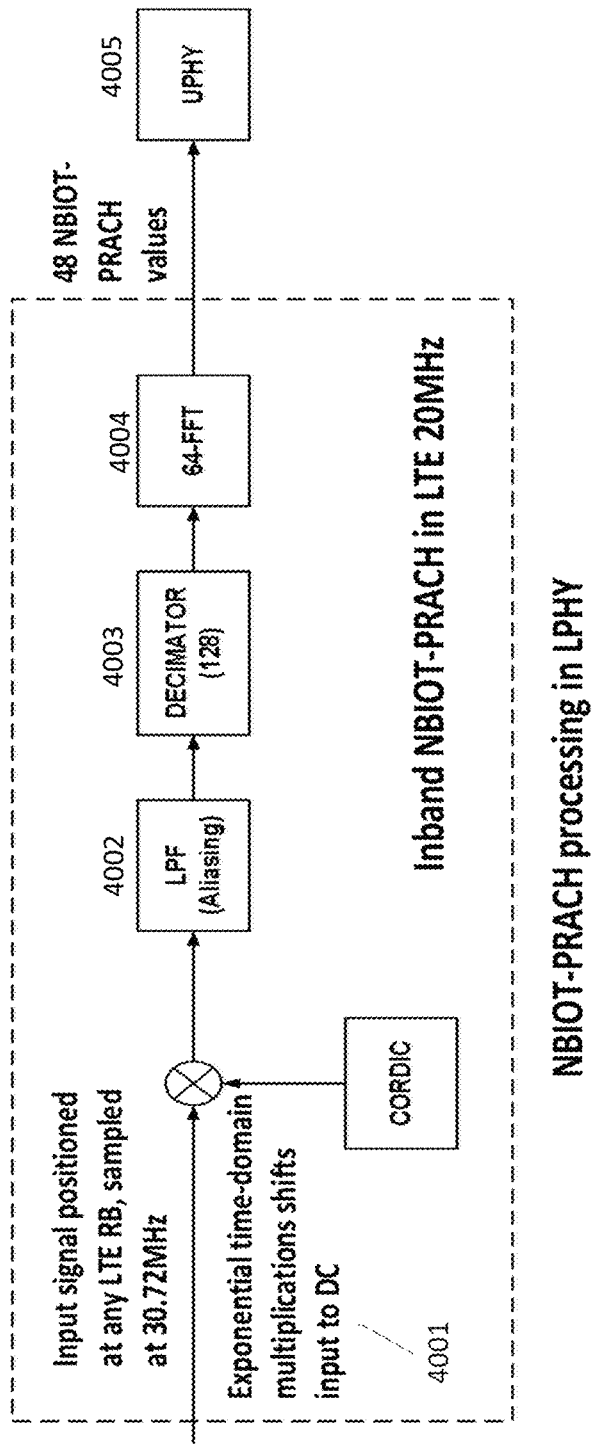
FIG. 4 illustrates overall NB-IoT-PRACH processing in LPHY.

The LPHY that supports NB-IoT (also referred to as NB-IoT-LPHY) is described in this section, which NB-IoT-LPHY should have additional processing to give the values to UPHY. The overall NB-IoT-PRACH processing in LPHY is illustrated in FIG. 4. The LPHY receives signals at 7.68 MHz sampling rate (multiplied by four, for a total of 30.72 MHz), assuming a 5 MHz LTE bandwidth (multiplied by four, for a total of 20 MHz). The LPHY first shifts (e.g., via exponential time-domain multiplication using Coordinate Rotation Digital Computer (CORDIC)) the signal from the relevant RB to the direct current (DC) or 0 Hz frequency, as shown by reference numeral 4001 in FIG. 4. The LPHY then applies a low-pass filter (LPF) (also referred to as aliasing removal filter), as shown by reference numeral 4002 in FIG. 4, and then decimates (at the decimator 4003 shown in FIG. 4) by a factor of 32 (multiplied by four, for a total of 128). The LPHY then takes a 64-point FFT (shown by reference numeral 4004 in FIG. 4) for each OFDM symbol and passes the 64 values to UPHY (shown by reference numeral 4005 in FIG. 4), which then extracts the relevant per-RB 48 subcarriers for further processing.

A brief conceptual overview of a conventional UPHY NPRACH receiver is described in this section, assuming there is no Physical Uplink Shared Channel (PUSCH) for the sake of simplicity. The received signal has 8192 points per Orthogonal frequency division multiplexing (OFDM) symbol, which can be down-converted by a factor of 16. The cyclic prefix from the received time domain samples is removed. Each OFDM symbol will have 8192 samples (without down-conversion). An 8192-point FFT is taken, and frequency domain samples are obtained. Next, power in each sub-carrier is added along the hopping patterns across all the repetitions. Let $R(n, i, f_k(n))$ denote the power of $i^{th}$ OFDM in nth symbol group on the $f_k(n)$th sub-carrier, and $f_k(n)$ is the sub-carrier on which kth user transmits in nth symbol group. To test for the presence of $UE_k$, the energy in the sub-carriers along the hopping pattern of UEk is summed across all repetitions as follows:

$$P_k = \frac{1}{5 N_{rep}^{NPRACH}} \sum_{n=1}^{N_{rep}^{NPRACH}} \sum_{i=1}^{5} |R(n, i, f_k(n))|^2$$

The sum power across all the symbol groups is compared to a threshold. If the power corresponding to a certain hopping pattern exceeds a threshold, then the user with the corresponding hopping pattern is detected. The threshold is set by plotting a histogram of signal and noise power.

The present disclosure provides a method in which the length of the transmit inverse fast Fourier transform (Tx-IFFT) at an OFDM transmitter (e.g., UE or base station (BS)) and the length of the receive fast Fourier transform (Rx-FFT) at an OFDM receiver (e.g., BS or UE) are different, which transmitter transmits on only a subset of possible subcarriers, and which receiver uses an appropriate equalizer to determine the values transmitted on the subset of subcarriers. The problem sought to be addressed by one example embodiment of the present disclosure is how to reconstruct NB-IoT PRACH without having a NB-IoT-compatible LPHY, instead simply using a LPHY that is capable of processing only LTE or 5G-NR signals. For the sake of simplicity, the case of reconstructing 12 NB-IoT PRACH subcarriers in an NB-IoT OFDM symbol using LTE-LPHY that processes PUSCH signals is discussed in this section. The LTE-LPHY processes 2048 samples by taking a 2048-point FFT (for the 20 MHz case and a sampling rate of 30.72 MHz), which block of 2048 samples is referred to as LTE PUSCH block (LPB). The signal received at the LPHY is treated like an LTE signal, which has many OFDM symbols. Each OFDM symbol has a data portion and a cyclic prefix. At 30.72 MHz, the data portion has 2048 samples. The first OFDM in every 7 OFDM symbols has a cyclic prefix of 160 samples, while the rest of OFDM symbols has a cyclic prefix of 144 samples. An LPHY that processes LTE signals discards all cyclic prefixes and processes the 2048 samples by taking 2048-point FFT. The 2048 samples of the data portion of the OFDM symbol is called LPB. Though the signal received is an NB-IoT signal, the LPHY assumes it is an LTE signal and treats it as such by processing the LPBs. It should be noted that the LTE-LPHY sends only 12 subcarriers per RB after taking a 2048-point FFT of the LPB. At this point, the problem is how to recover the 12 NB-IoT PRACH subcarriers (SCs) from the 12 values sent by the LTE-LPHY in the NB-IoT RB after the 2048 samples of the LPB are processed at 30.72 MHz.

Figure 5A:
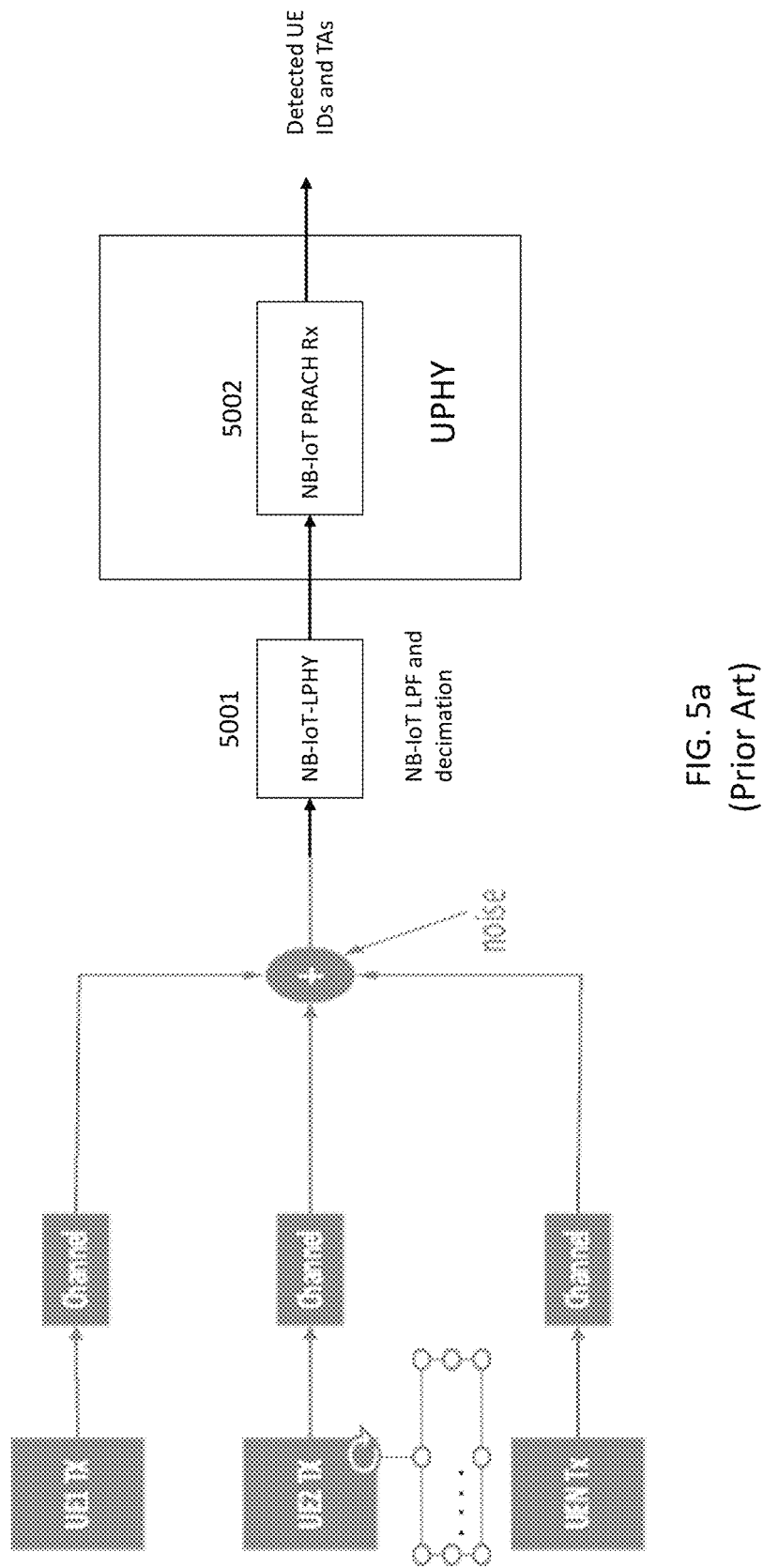
FIG. 5a depicts a conventional NB-IoT PRACH detector or receiver in UPHY working with a compatible LPHY that supports NBIOT operations.

FIG. 5a depicts a conventional NB-IoT PRACH detector or receiver (denoted as NB-IoT PRACH Rx 5002) in UPHY working with a compatible LPHY (denoted as NB-IoT-LPHY 5001) that supports NBIOT operations. In contrast, according to an example embodiment of the present disclosure shown in FIG. 5b, a new processing method which does not involve NB-IoT-LPHY 5001 is enabled (as represented by the upper right path above the conventional path involving NB-IoT-LPHY 5001 and NB-IoT PRACH Rx 5002) by providing an additional processing module 5004, which is configured as an equalizer. The equalizer 5004 enables the NB-IoT PRACH Rx 5002 in UPHY to work with an LPHY (denoted as LTE-LPHY/5G-NR-LPHY 5003) that only supports LTE operations and/or 5G-NR operations but not NB-IoT operations. By providing the equalizer module 5004, the example embodiment according to the present disclosure significantly increases the versatility to work with a broader range of LPHYs.

Figure 5B:
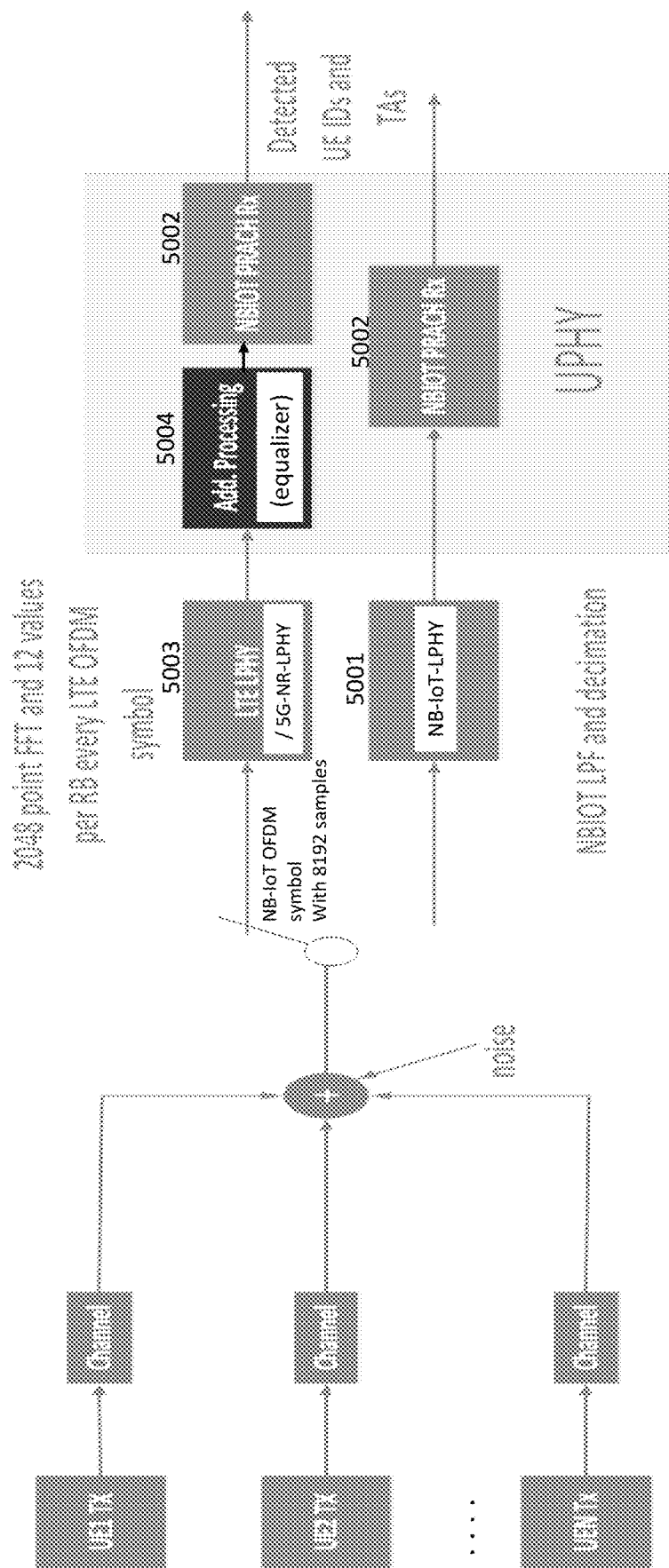
FIG. 5b shows an example embodiment of the present disclosure.
Figure 6:
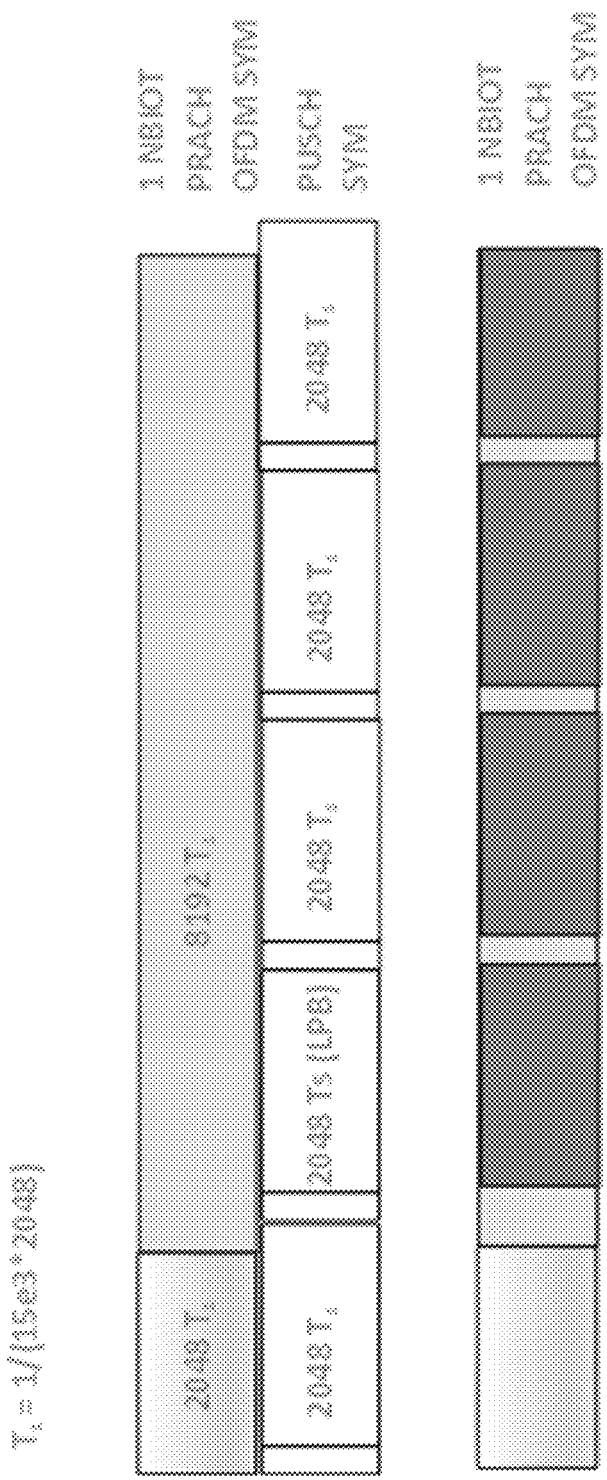
FIG. 6 illustrates reconstruction of NPRACH from PUSCH for one OFDM symbol.

In the example embodiment illustrated in FIG. 5b, the received NB-IoT OFDM symbol will have 8192 samples at a sampling rate of 30.72 MHz (four times the length of an LTE OFDM symbol at the same sampling rate, as shown in FIG. 6, which generally illustrates reconstruction of NPRACH from PUSCH for one OFDM symbol, with the received NPRACH shown on top, and the reconstructed NPRACH shown on the bottom). This is processed with LTE-LPHY/5G-NR-LPHY 5003 which uses 2048-point FFT on the LTE PUSCH block (LPB). LTE-LPHY/5G-NR-LPHY 5003 then sends 12 values (subcarriers) from the FFT output corresponding to the NB-IoT RB to the UPHY (which FFT output is referred to in the present description as desired LTE-LPHY output (DLLO)).

Figure 7:
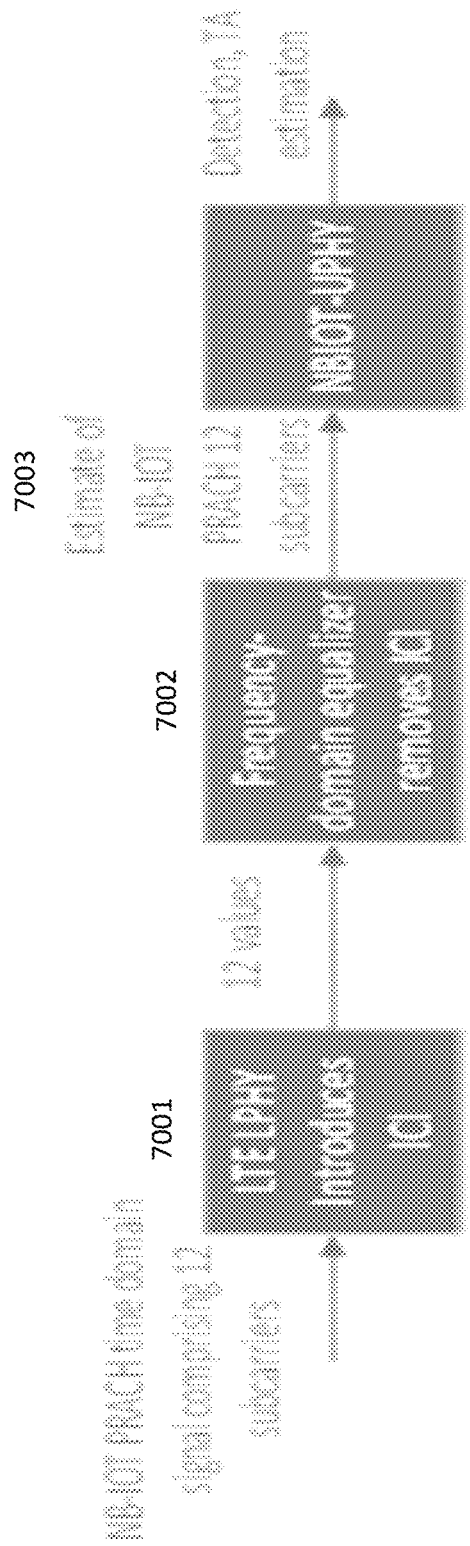
FIG. 7 illustrates introduction of ICI due to LTE-LPHY processing and subsequent removal of ICI by the equalizer.

In any OFDM symbol, the subcarriers (SCs) of the OFDM are orthogonal only when FFT is taken on the entire OFDM symbol. If a fraction of the OFDM symbol is taken and FFT computed, the SCs are no longer orthogonal and intercarrier interference (ICI) exists between the SCs. The LPB has 2048 time-domain samples of a quarter of the NB-IoT PRACH OFDM symbol, which is made up of 12 NB-IoT PRACH subcarriers, so each of the 12 values in the DLLO is influenced by the 12 NB-IoT PRACH SCs via ICI (as orthogonality is lost). The effect of LTE-LPHY processing is that the DLLOs sent to UPHY will be subject to ICI (as shown at 7001 in FIG. 7), so the equalizer 5004 is applied to the DLLOs to remove the ICI (as shown at 7002 in FIG. 7). To recover the 12 NB-IoT PRACH SCs, the equalizer 5004 needs to be applied on all 12 values of the DLLO. In the case of 48-subcarrier NB-IoT PRACH, the equalizer 5004 is applied on 4 DLLOs corresponding to four different LPBs of the NB-IoT OFDM symbol. The 4 DLLOs have 48 values, so it is necessary to estimate 48 NBIOT-SCs (as shown at 7003 in FIG. 7).

Although the example embodiment is described in detail in the context of LTE-LPHY processing, the present disclosure applies equally to 5G-NR-LPHY, i.e., the received NB-IoT OFDM symbol is processed by 5G-NR-LPHY, which 5G-NR-LPHY then sends 12 values from the FFT output corresponding to the NB-IoT resource block (RB) to the UPHY. Although 5G NR has many bandwidth parts corresponding to many subcarrier spacings, for the sake of simplicity 15 kHz subcarrier spacing is assumed in this example, which is the same as in LTE. Nevertheless, other bandwidth parts and subcarrier spacing, e.g., 30 kHz, can be utilized in connection with the technique disclosed herein.

In the present specification, MATLAB notation will be used, as follows:

A.*B is element-wise multiplication of two matrices A, B.

A./B is element-wise division

A(m:n, c:d) is submatrix of A comprising rows m to n, and columns c to d

A(:, c; d) means all rows of A and columns c to d.

[A; B] means stacking up two matrices A and B one on top of another.

If x is row or column matrix, then D(x) is a diagonal matrix with x on the diagonal.

A detailed description of the example embodiment of the equalizer 5004 shown in FIG. 5b is provided herein. The system model for the equalizer 5004 is represented by:

$$y_i = A_i \bar{x} + n$$

In the above equation, the following definitions apply:

$y_i$ is the received 12×1 (or 24×1, or 36×1, or 48×1) vector of subcarriers of the desired RB (this is selected from the 2048-point FFT output);

n is the additive white Gaussian noise (AWGN) with variance $\sigma^2$;

the LTE PUSCH block (LPB) index is i, and $A_i$ is the 12×12 system matrix (or 12×24, or 12×36, or 12×48);

$\bar{x}$ is the vector of 12/24/36/48 subcarriers along with the frequency domain channel; $\bar{x} = H.*x$ where H is a 12/24/36/48×1 of frequency domain channel vectors of transmitted users, and x is 12/24/36/48×1 vector of '1' and '0' (users transmitting or not) corresponding to NB-IoT SCs.

The various types of LPB is given in the table below:

Types of LPB

| Type | Description | Comment |
|---|---|---|
| 1 | LPB overlaps with the CP of NB-IoT PRACH | Unused |
| 2 | LPB is entirety contain in NPRACH OFDM symbol | Used for estimation |
| 3 | LPB overlaps between two symbols in the same SG | Used for estimation |
| 4 | LPB overlaps between two SGs | Unused |

Details of the receiver (in the case of using 12 subcarriers) are described below. For Type 2 LPB, the following conditions apply:

1) Let $t_b^{(i)}$, $t_e^{(i)}$ be the beginning and end indices of the LPB; they differ by 2048 (on a scale of 0-2047).
2) Similarly, let $f_{b,nbiot}^{(i)}$, $f_{e,nbiot}^{(i)}$ be the beginning and end IFFT indices of the NB-IoT PRACH RB (on 8192 scale, not 2048; and RB=48 SCs).
3) Similarly, let $f_{b,lte}^{(i)}$, $f_{e,lte}^{(i)}$ be the beginning and end IFFT indices of the NB-IoT PRACH RB (on 2048 scale and RB=12 SCs).
4) Let $F_N$ be the NXN FFT matrix whose (m, n)th element is $$\frac{e^{-\frac{j2\pi mn}{N}}}{N}$$

where m, n is between 0 and N−1.
5) The IFFT matrix is $G_N = NF_N^H$. Note that $G_N F_N = I$ identity matrix.
6) $A_i = F_{2048}(f_{b,lte}^{(i)}:f_{e,lte}^{(i)},:) G_{8192}(t_b^{(i)}:t_e^{(i)}, f_{b,nbiot}^{(i)}:f_{e,nbiot}^{(i)})$ System model for Type 3 LPB is described below. In Type 3, the LPB overlaps two OFDM symbols, both of which are the same, so the IFFT matrix encompasses rows of IFFT corresponding to both symbols. We use a set of rows at the end and beginning of the $G_{8192}$ matrix such that the total sum of the sets of two rows is 2048. $A_i = F_{2048}(f_{b,lte}^{(i)}:f_{e,lte}^{(i)},:) [G_{8192}(t_b^{(i)}:8191, f_{b,nbiot}^{(i)}:f_{e,nbiot}^{(i)}); G_{8192}(0:2048-(8191-t_b^{(i)}+1)-1, f_{b,nbio}^{(i)}$ Regarding the equalizer (e.g., 5004 shown at FIG. 5b), the following conditions apply.
1) $y_i = A_i \bar{x} + n$ is input-output equation.
2) The optimal solution is expressed $\bar{x} = (A_i^H A_i + \sigma^2 I)^{-1} A_i^H y_i$. In this equation, $\sigma^2$ is noise variance that can be obtained, as an example, from PUSCH SNR calculations.
3) For the sake of simplification, we define a substitute variable $M_i$ as follows:

$$M_i = (A_i^H A_i + \sigma^2 I)^{-1} A_i^H$$

Alternatively, we can stack a few $y_i$, e.g., let's assume stacking two LPBs. In this case, the following apply:

$$\bar{y}_i = \begin{bmatrix} y_i \\ y_{i+1} \end{bmatrix} = \begin{bmatrix} A_i \\ A_{i+1} \end{bmatrix} \bar{x} = \bar{A}_i \bar{x} \quad (4)$$

5) The optimal solution is expressed as $\bar{x} = (\bar{A}_i^H \bar{A}_i + \sigma^2 I)^{-1} \bar{A}_i^H \bar{y}_i = \bar{M}_i \bar{y}_i$. In this equation, $\sigma^2$ is noise variance that can be obtained, as an example, from PUSCH SNR calculations. Here $\bar{M}_i = (\bar{A}_i^H \bar{A}_i + \sigma^2 I)^{-1} \bar{A}_i^H$.

Details of the receiver (in the case of using 48 subcarriers) are described below. The system model is represented by the equation $y_i = A_i \bar{x}$. In this equation, $\bar{x}$ is 48×1, $A_i$ is 12×48, and $y_i$ is 12×1, so it is necessary to stack 4 of the above-given equations to get 48 observations to estimate 48 subcarriers. As an example, $\bar{Y}_i = \bar{A}_i \bar{x}$ where $$\bar{y}_i = \begin{bmatrix} y_i \\ y_{i+1} \\ y_{i+2} \\ y_{i+3} \end{bmatrix}, \bar{A}_i = \begin{bmatrix} A_i \\ A_{i+1} \\ A_{i+2} \\ A_{i+3} \end{bmatrix}$$

In this example, the following apply:
1) $\bar{y}_i = \bar{A}_i \bar{x}$
2) The optimal solution is $\bar{x} = (\bar{A}_i^H \bar{A}_i + \sigma^2 I)^{-1} \bar{A}_i^H \bar{y}_i = \bar{M}_i \bar{y}_i$. In this equation, $\sigma^2$ is noise variance that can be obtained, as an example, from PUSCH SNR calculations. Here $\bar{M}_i = (\bar{A}_i^H \bar{A}_i + \sigma^2 I)^{-1} \bar{A}_i^H$.

In this section, an example embodiment of a low-complexity equalizer (e.g., 5004 shown in FIG. 5b) is described. First, the case of using 12 subcarriers is described, e.g., to compute $A_k$ from $A_i$ for $k \neq i$. Note that $t_{i \to k} = D(G_{8192}(t_b^{(k)},:)./G_{8192}(t_b^{(i)},:))$ and $A_k = A_i t_{i \to k}$. We have $M_k = t_{i \to k}^{-1} M_i$, and $t_{i \to k}^{-1}$ can be computed as it is a diagonal matrix. For the case where many LPBs are stacked together, we need to compute $\bar{A}_k$ from $\bar{A}_i$ for $k \neq i$. Note that $t_{i+a \to k+a} = t_{i \to k}$. So, $\bar{A}_k = \bar{A}_i t_{i \to k}$. This is applicable only for the case where $t_b^{(i+1)} - t_b^{(i)} = t_b^{(k)} - t_b^{(k+1)}$ (as CP lengths are different in first and non-first OFDM symbols), $\bar{M}_k = t_{i \to k}^{-1} \bar{M}_i$.

An example to compute $f_{e,nbiot}^{(i)}$, $f_{b,nbiot}^{(i)}$ given the RB index is described here. Let us assume 5 MHz and RB index varies from 1-25, and the following conditions apply:
1) $f_{b,nbiot}^{(i)} = \{(R-1)12 - 150\}4$
2) $f_{e,nbiot}^{(i)} = f_{b,nbiot}^{(i)} + 47$
3) If any of the above nbiot indices is negative, add 8192.
4) $f_{b,lte}^{(i)} = \{(R-1)12 - 150\}$
5) $f_{e,lte}^{(i)} = f_{b,lte}^{(i)} + 11$
6) If any of the LTE indices is negative, add 2048.

The implementation can include the following. For a given bandwidth (BW), only some RBs are used in inband mode. The $A_1$ matrix is calculated for the first LPB in this RB. Then, $A_i$ is regenerated for the $i^{th}$ LPB from $A_1$, which just requires 12 reciprocal operations and 144 multiplications, i.e., essentially multiplying by a diagonal matrix.

In this section, the case of using 48 subcarriers is described. Let us split $A_i$ and $t_{i \to k}$, which are 12×48 and 48×48, respectively. $A_i = [A_i^{(1)} A_i^{(2)} A_i^{(3)} A_i^{(4)}]$ where $A_i^{(.)}$ are all 12×12. Let $$t_{i \to k} = \begin{bmatrix} t_{i \to k}^{(1)} & 0 & 0 & 0 \\ 0 & t_{i \to k}^{(2)} & 0 & 0 \\ 0 & 0 & t_{i \to k}^{(3)} & 0 \\ 0 & 0 & 0 & t_{i \to k}^{(4)} \end{bmatrix},$$

where $t_{i \to k}^{(.)}$ are all 12×12. To compute the inverses of $\bar{A}_i$ and $\bar{A}_k$ in a low-complexity manner, we compute the inverse of $$\bar{A}_i = \begin{bmatrix} A_i^{(1)} & A_i^{(2)} & A_i^{(3)} & A_i^{(4)} \\ A_{i+1}^{(1)} & A_{i+1}^{(2)} & A_{i+1}^{(3)} & A_{i+1}^{(4)} \\ A_{i+2}^{(1)} & A_{i+2}^{(2)} & A_{i+2}^{(3)} & A_{i+2}^{(4)} \\ A_{i+3}^{(1)} & A_{i+3}^{(2)} & A_{i+3}^{(3)} & A_{i+3}^{(4)} \end{bmatrix},$$

where $\overline{A}_i$ is a block matrix with individual matrices $A_{i+n}^{(m)}$, n=0, 1, 2, 3, and m=1, 2, 3, 4.

$\overline{A}_i^{-1}$ can be computed from inverses of $A_{i+n}^{(m)-1}$, n=0, 1, 2, 3, and m=1, 2, 3, 4.

To compute the inverses of $\overline{A}_i$ and $\overline{A}_k$ in a low-complexity manner, we compute the inverse of $$\overline{A}_k = \begin{bmatrix} A_i^{(1)}t_{i\to k}^{(1)} & A_i^{(2)}t_{i\to k}^{(2)} & A_i^{(3)}t_{i\to k}^{(3)} & A_i^{(4)}t_{i\to k}^{(4)} \\ A_{i+1}^{(1)}t_{i+1\to k+1}^{(1)} & A_{i+1}^{(2)}t_{i+1\to k+1}^{(2)} & A_{i+1}^{(3)}t_{i+1\to k+1}^{(3)} & A_{i+1}^{(4)}t_{i+1\to k+1}^{(4)} \\ A_{i+2}^{(1)}t_{i+2\to k+2}^{(1)} & A_{i+2}^{(2)}t_{i+2\to k+2}^{(2)} & A_{i+2}^{(3)}t_{i+2\to k+2}^{(3)} & A_{i+2}^{(4)}t_{i+2\to k+2}^{(4)} \\ A_{i+3}^{(1)}t_{i+3\to k+3}^{(1)} & A_{i+3}^{(2)}t_{i+3\to k+3}^{(2)} & A_{i+3}^{(3)}t_{i+3\to k+3}^{(3)} & A_{i+3}^{(4)}t_{i+3\to k+3}^{(4)} \end{bmatrix}$$

Note that $\overline{A}_k$ is a block matrix with individual matrices $A_{i+n}^{(m)} t_{i+n\to k+n}^{(m)}$, n=0, 1, 2, 3, and m=1, 2, 3, 4. $\overline{A}_k^{-1}$ can be computed from inverses of $A_{i+n}^{(m)-1}$, $t_{i+n\to k+n}^{(m)H}$, n=0, 1, 2, 3, and m=1, 2, 3, 4. Inverse of $t_{i+n\to k+n}^{(m)H}$ is readily obtained as it is a diagonal matrix.

We considered 12 subcarriers and 16 repetitions for simulation, and AWGN channel was considered. 2048-FFT method (PUSCH) is the example method according to the present disclosure that uses LTE-LPHY, and 8192-FFT method is used as the baseline method, in which we recover NB-IoT PRACH subcarrier using 8192 FFT.

Figure 8:
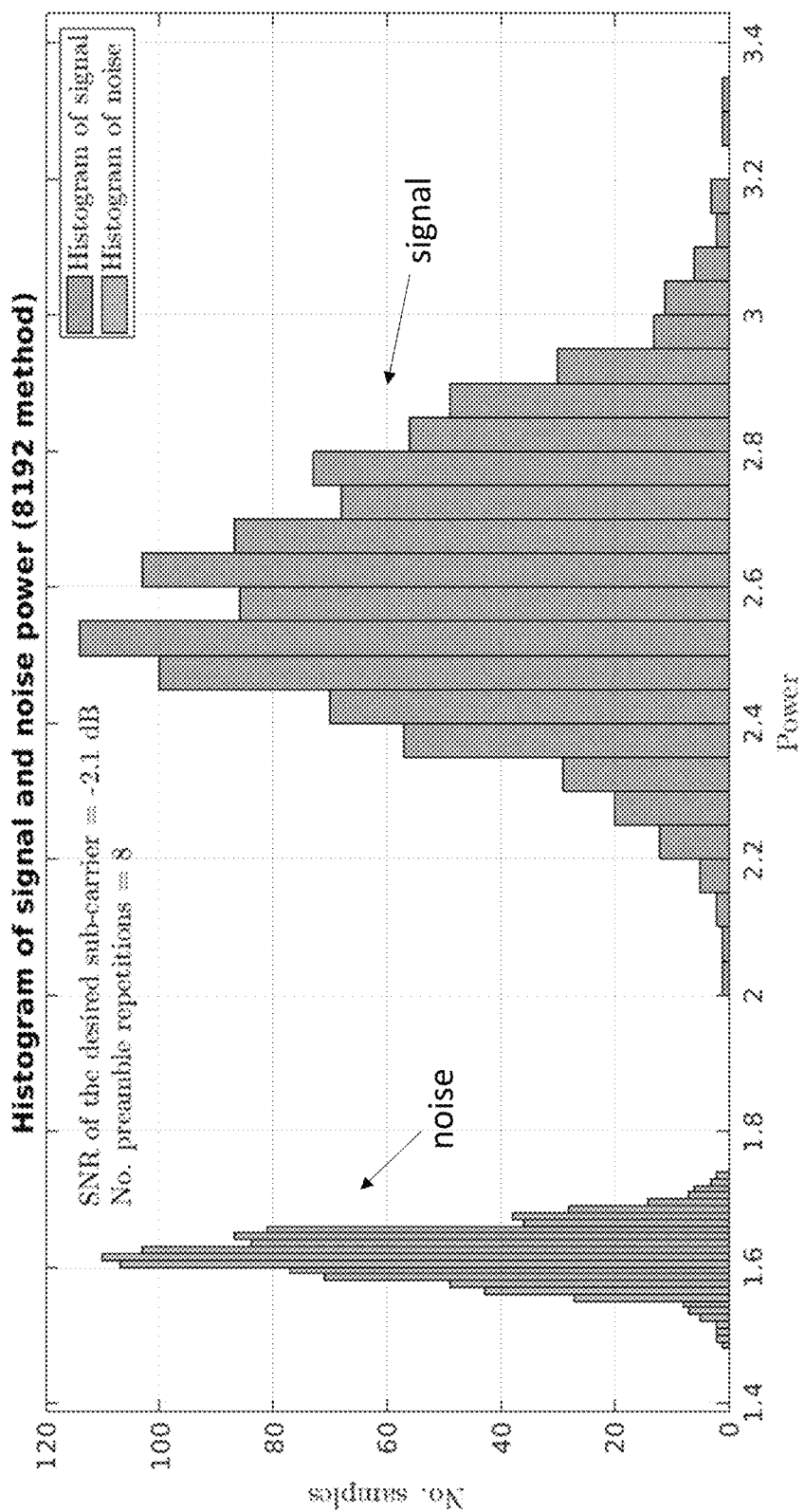
FIG. 8 illustrates the histograms of signal and noise power in AWGN channel for 8192-FFT method.
Figure 9:
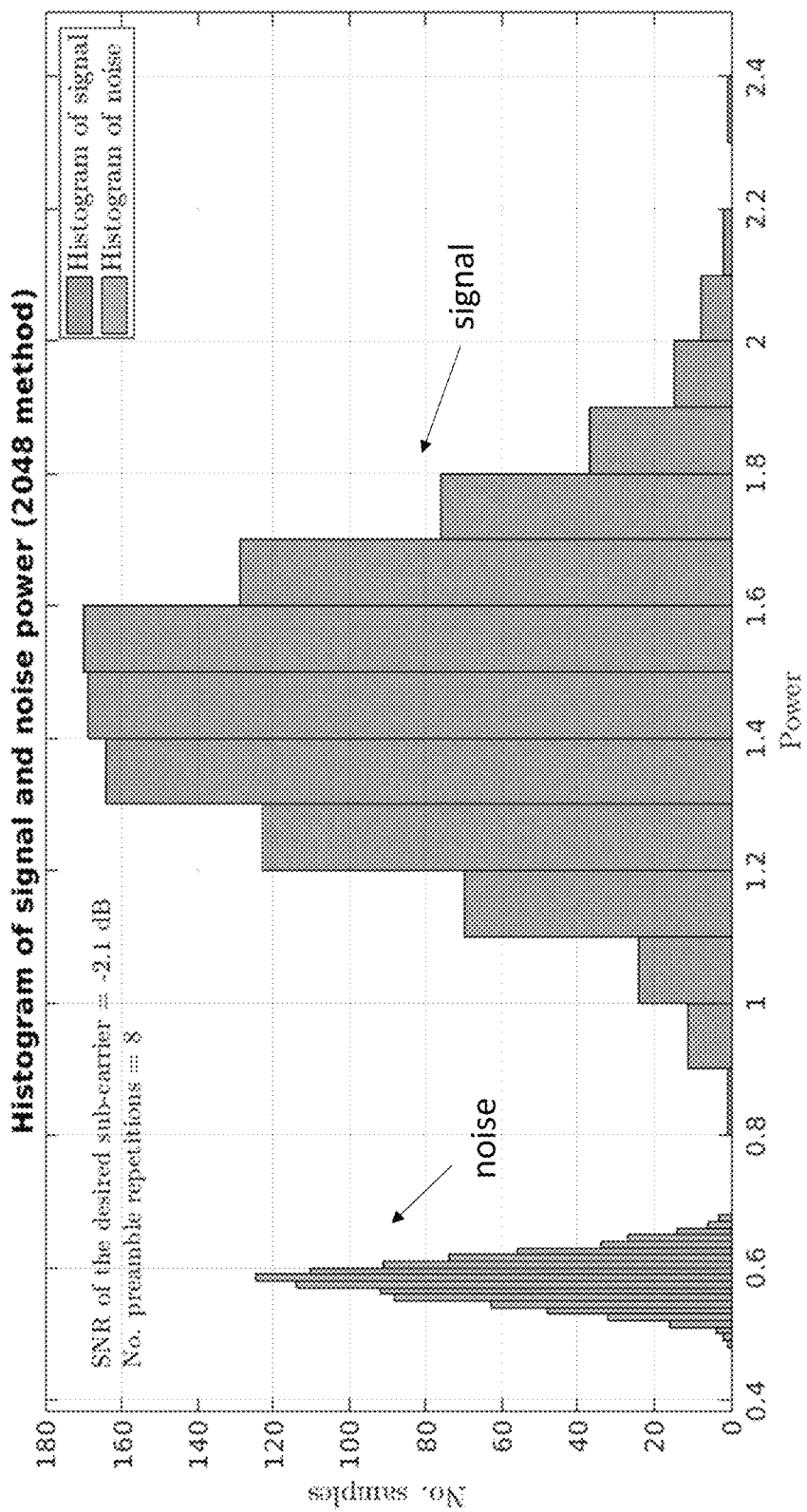
FIG. 9 illustrates the histograms of signal and noise power in AWGN channel for 2048-FFT method.

Detection performances of the two methods (2048-FFT and 8192-FFT methods) in AWGN channel is discussed in this section. The reconstruction algorithm with the NPRACH receiver is integrated to obtain the detection performance using both of the methods. In order to obtain the detection performance, we require appropriate thresholds to be set for the detection. For this, the histograms of signal and noise using both of the methods are plotted. FIGS. 8 and 9 show the histograms of signal and noise power in AWGN channel for 8192-FFT method and 2048-FFT method, respectively. Using these histograms, appropriate thresholds are set. Frequency offset (FO) arises because of a mismatch in frequencies of the oscillators of the base station and the UE. It is measured in Hz. The simulation parameters used are as follows: number of repetitions=8; SNR on the desired sub-carrier=−2.1 dB; FO=0, number of Rx antennas=1. As summarized in the table below, the performances of the two methods (2048-FFT and 8192-FFT) are extremely good: both methods achieve a probability of detection >99%, and probability of false alarm <0.1% in AWGN channel.

| $P_d$ and $P_f$ in AWGN channel | | | |
|---|---|---|---|
| Method | Threshold | Probability of detection | Probability of false alarm |
| 8192 FFT method | 2.15 | 99.5% | 0.01% |
| 2048 FFT method | 0.6 | 99.6% | 0.01% |

Figure 10:
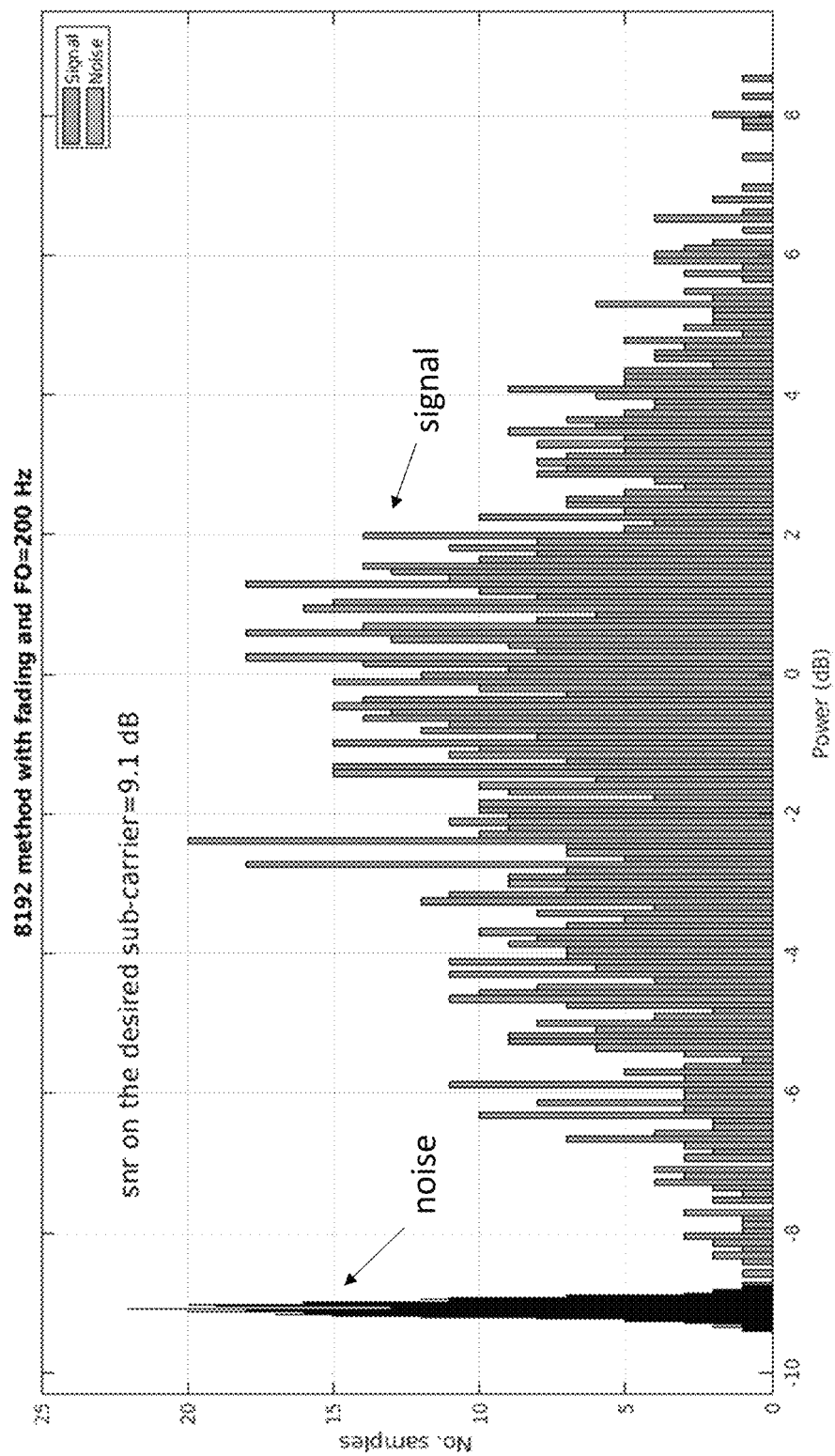
FIG. 10 illustrates the histograms of signal and noise in fading channel for 8192-FFT method.
Figure 11:
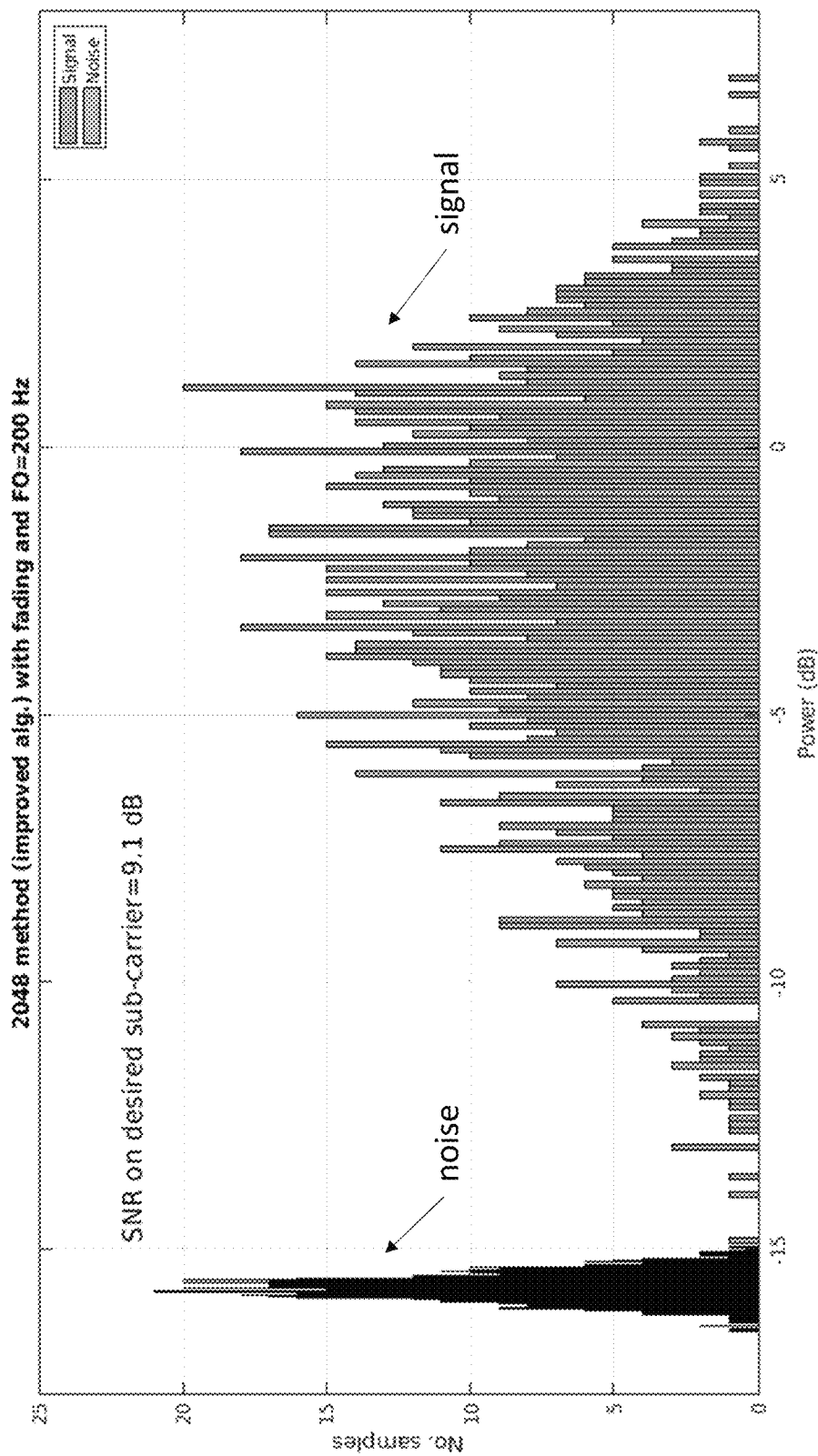
FIG. 11 illustrates the histograms of signal and noise in fading channel for 2048-FFT method.

Next, we plot the histograms of signal and noise using both the methods in fading channel with frequency offset. FIGS. 10 and 11 show the histograms of signal and noise in fading channel for 8192-FFT method and 2048-FFT method, respectively. Using these histograms, appropriate thresholds are set. The simulation parameters used are as follows: number of repetitions=8; SNR on the desired sub-carrier=9.1 dB; FO=200 Hz; number of Rx antennas=1. As summarized in the table below, the performances of the two methods (2048-FFT and 8192-FFT) are extremely good: both methods achieve a probability of detection >99%, and probability of false alarm <0.1%

| $P_d$ and $P_f$ in fading channel | | | |
|---|---|---|---|
| Method | Threshold | Probability of detection ($P_d$) | Probability of false alarm ($P_f$) |
| 8192 FFT method | −8 | 99.1% | 0.03% |
| 2048 FFT method | −13.5 | 99.4% | 0.02% |

Figure 12:
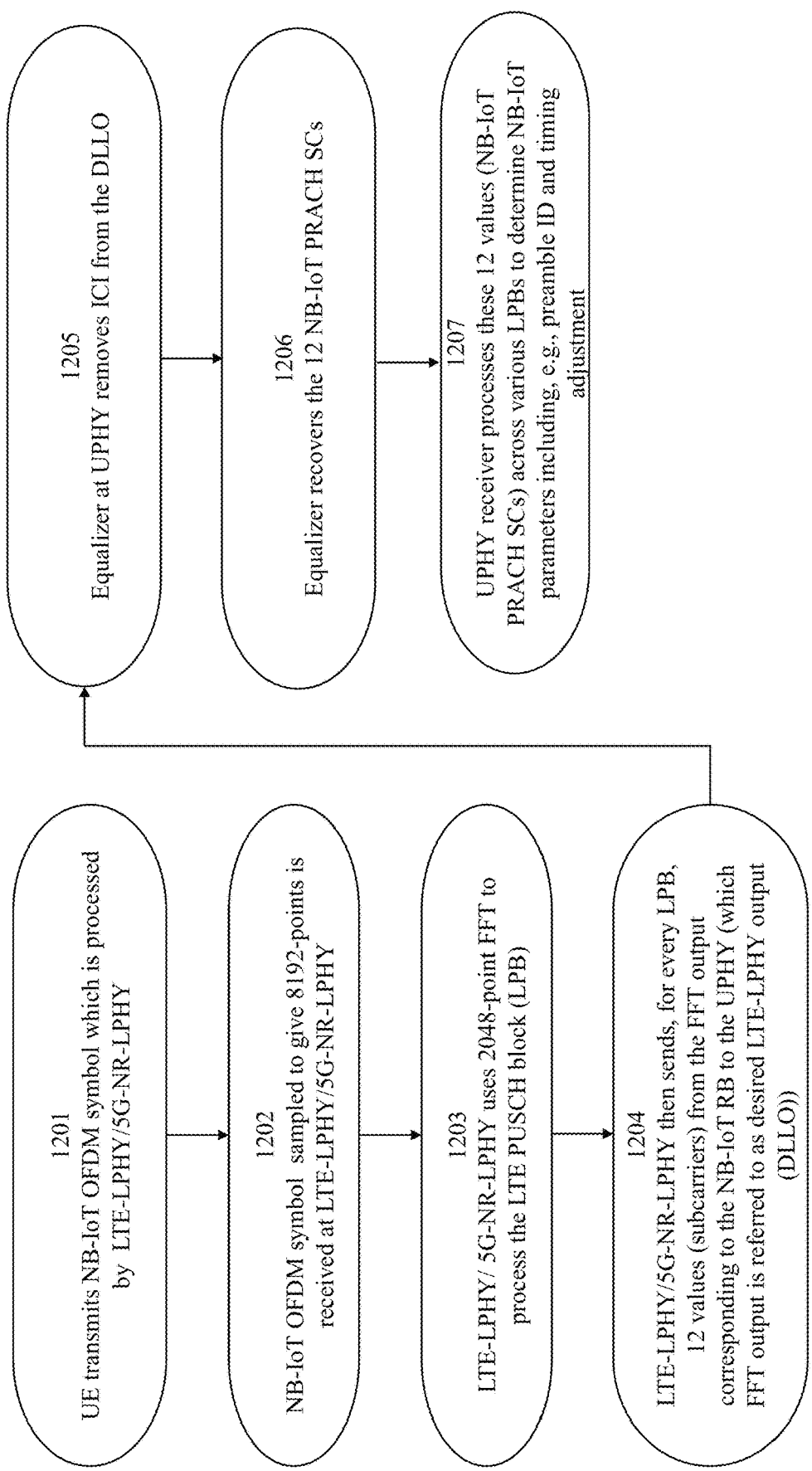
FIG. 12 is a flowchart of an example embodiment of the method according to the present disclosure.

FIG. 12 is a flowchart of an example embodiment of the method according to the present disclosure, in which method 12 values (subcarriers) from the FFT output corresponding to the NB-IoT RB are sent by LTE_LPHY/5G_NR LPHY to the UPHY. At block 1201, UE transmits NB-IoT OFDM symbol which is processed by LTE-LPHY/5G-NR-LPHY. At block 1202, NB-IoT OFDM symbol sampled to give 8192-points is received at LTE-LPHY/5G-NR-LPHY. At block 1203, LTE-LPHY/5G-NR-LPHY uses 2048-point FFT to process the LTE PUSCH block (LPB). At block 1204, LTE-LPHY/5G-NR-LPHY then sends, for every LPB, 12 values (subcarriers) from the FFT output corresponding to the NB-IoT RB to the UPHY (which FFT output is referred to as desired LTE-LPHY output (DLLO)). At block 1205, the equalizer at UPHY removes ICI from the DLLO. At block 1206, the equalizer recovers the 12 NB-IoT PRACH SCs. At block 1207, UPHY receiver processes these 12 values across various LPBs to determine NB-IoT parameters including, e.g., preamble ID and timing adjustment.

Glossary of Terms

3GPP: Third generation partnership project
AWGN: additive white Gaussian noise
BBU: baseband unit
Coordinate Rotation Digital Computer (CORDIC)
CP: cyclic prefix
C-RAN: cloud radio access network
CU: Centralized unit
DC: direct current
DL: downlink
DMRS: demodulation reference signal
DU: Distributed unit
eNB: Evolved Node B
FH: Fronthaul
FFT: Fast Fourier Transform
iFFT: inverse Fast Fourier Transform
IoT: Internet of things
LPB: LTE PUSCH block
LPF: low-pass filter
LTE: long term evolution
NB-IoT: Narrow-band Internet of Things
NPDSCH: Narrowband Physical Downlink Shared Channel
NPRACH: NB-IoT physical random-access channel
NR: New radio
OFDM: Orthogonal frequency division multiplexing
OFDMA: Orthogonal Frequency-Division Multiple Access
O-RAN: Open RAN (Basic O-RAN specifications are prepared by the O-RAN alliance)
PDCCH: Physical downlink Control Channel
PDSCH: physical downlink shared channel
PHY: physical layer
    LPHY: lower physical layer
    UPHY: upper physical layer PUCCH: Physical Uplink Control Channel
PUSCH: Physical Uplink Shared Channel
RACH: random access channel
　　PRACH: physical random-access channel
RB: resource block
RF: radio frequency interface
RRU: Remote radio unit
RU: Radio Unit
RS: reference signal
SC: subcarrier
SC-FDMA: Single Carrier Frequency-Division Multiple Access
SINR: signal-to-interference-plus-noise ratio
UE: user equipment
UL: uplink

What is claimed is:

1. A method of communicating using Orthogonal Frequency Division Multiplexing (OFDM), comprising:
　transmitting, from an OFDM transmitter to an OFDM receiver, a signal for which the length of the transmit inverse fast Fourier transform (Tx-IFFT) at the OFDM transmitter and the length of the receive inverse fast Fourier transform (Rx-FFT) at the OFDM receiver are different, wherein the OFDM transmitter transmits values on only a subset of possible subcarriers;
　determining, by an equalizer of the OFDM receiver, the values transmitted on the subset of subcarriers;
　wherein:
　　the method is for Narrow-band Internet of Things (NB-IoT) physical random-access channel (NPRACH) communication;
　　the OFDM transmitter is a user equipment (UE) transmitting an NB-IoT Orthogonal Frequency-Division Multiple Access (OFDMA) symbol using a transmit inverse fast Fourier transform (Tx-IFFT) having a first length;
　　a baseband unit (BBU) comprises the OFDM receiver, wherein a lower physical layer (LPHY) of the BBU is configured to support at least LTE and processes the NB-IoT OFDMA symbol using a receive fast Fourier transform (Rx-FFT) having a second length different from the first length to generate an Rx-FFT output, and the NB-IoT OFDM symbol received at the LPHY has 8192 samples; and
　　the LPHY of the BBU sends to upper physical layer (UPHY) of the BBU a selected number of values of the Rx-FFT output corresponding to desired resources block in the NB-IoT OFDMA symbol;
　processing, at the LPHY, the NB-IoT OFDM symbol using 2048-point FFT on LTE Physical Uplink Shared Channel block (LPB);
　filtering, at the UPHY, intercarrier interference (ICI) from the selected number of values of the Rx-FFT output; and
　reconstructing, at the UPHY, the NB-IoT OFDMA symbol.

2. The method according to claim 1, wherein:
　the LPHY is not configured to support NB-IoT standard.

3. The method according to claim 2, wherein:
　the UPHY comprises an equalizer for the filtering and an NPRACH detector for reconstructing the NB-IoT OFDMA symbol.

4. The method according to claim 2, wherein the LPHY is configured to support one of Long-Term Evolution (LTE) or 5G New Radio (5G-NR) standard.

5. The method according to claim 3, wherein the LPHY is configured to support one of Long-Term Evolution (LTE) or 5G New Radio (5G-NR) standard.

6. The method according to claim 1, wherein
　the LPHY sends 12 values from the Rx FFT output corresponding to subcarriers of resource block (RB) in the NB-IoT OFDMA symbol to the UPHY.

7. The method according to claim 1, wherein a system model of the equalizer is represented by the equation $$y_i = A_i x + n$$

where:
　$y_i$ is the 12×1 vector of subcarriers of RB in the NB-IoT OFDMA symbol;
　n is the additive white Gaussian noise (AWGN) with variance $\sigma^2$;
　i is LPB index;
　$A_i$ is 12×12 system matrix; and $$\bar{x} = H.*x$$

where H is a 12×1 frequency domain channel vector of the UE, and x is 12×1 vector corresponding to NB-IoT subcarriers.

8. The method according to claim 7, wherein:
　the LPHY is not configured to support NB-IoT standard.

9. The method according to claim 8, wherein:
　the UPHY comprises an equalizer for the filtering and an NPRACH detector for reconstructing the NB-IoT OFDMA symbol.

10. The method according to claim 8, wherein the LPHY is configured to support one of Long-Term Evolution (LTE) or 5G New Radio (5G-NR) standard.

11. The method according to claim 9, wherein the LPHY is configured to support one of Long-Term Evolution (LTE) or 5G New Radio (5G-NR) standard.

12. The method according to claim 7, wherein
　the LPHY sends 12 values from the Rx FFT output corresponding to subcarriers of resource block (RB) in the NB-IoT OFDMA symbol to the UPHY.

* * * * *